United States Patent
Mochida

(10) Patent No.: US 8,450,862 B2
(45) Date of Patent: May 28, 2013

(54) ELECTRIC POWER GENERATING APPARATUS

(75) Inventor: Takashi Mochida, Chiba (JP)

(73) Assignee: Sony Corporation, Tokyo (JP)

(*) Notice: Subject to any disclaimer, the term of this patent is extended or adjusted under 35 U.S.C. 154(b) by 804 days.

(21) Appl. No.: 12/615,400

(22) Filed: Nov. 10, 2009

(65) Prior Publication Data

US 2010/0117607 A1 May 13, 2010

(30) Foreign Application Priority Data

Nov. 10, 2008 (JP) ................. 2008-287576

(51) Int. Cl.
*F03G 7/08* (2006.01)

(52) U.S. Cl.
USPC ........................................................ 290/1 R

(58) Field of Classification Search
USPC ............... 290/1 R, 1 A; 307/68; 310/12, 13, 310/14, 15, 22, 23; 704/258–272
See application file for complete search history.

(56) References Cited

U.S. PATENT DOCUMENTS

| | | | | |
|---|---|---|---|---|
| 5,007,095 | A | * | 4/1991 | Nara et al. .................. 704/261 |
| 6,211,775 | B1 | * | 4/2001 | Lee et al. .................. 340/407.1 |
| 2003/0155771 | A1 | * | 8/2003 | Cheung et al. ............. 290/1 R |
| 2010/0117373 | A1 | | 5/2010 | Mochida et al. |

FOREIGN PATENT DOCUMENTS

JP 2008147126 A * 6/2008

* cited by examiner

*Primary Examiner* — Tulsidas C Patel
*Assistant Examiner* — Viet Nguyen
(74) *Attorney, Agent, or Firm* — Wolf, Greenfield & Sacks, P.C.

(57) ABSTRACT

Disclosed is an electric power generating apparatus. The electric power generating apparatus includes a casing including an interior space, a permanent magnet that is provided in the interior space and capable of being reciprocated, a coil provided on an outer periphery of the interior space, an electric circuit unit to output a voltage, as an electric energy, generated in the coil by reciprocating the permanent magnet, a detection unit to detect a characteristic of the voltage, and a sound generation unit to generate sound that is associated with at least one of a period and amplitude of the voltage based on a result of detection by the detection unit.

12 Claims, 15 Drawing Sheets

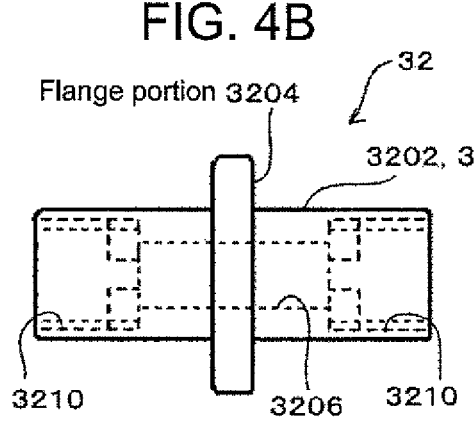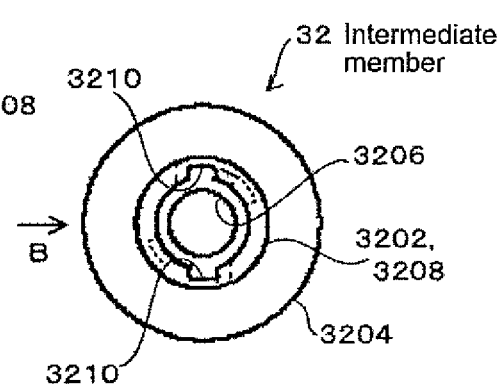

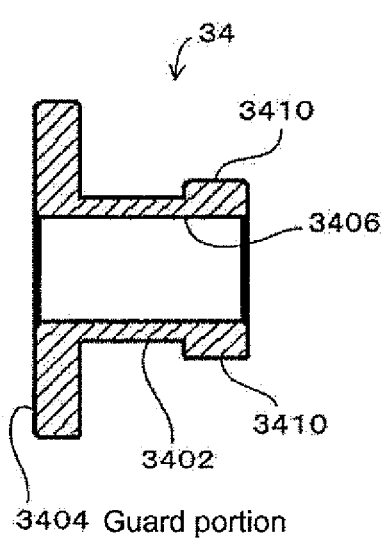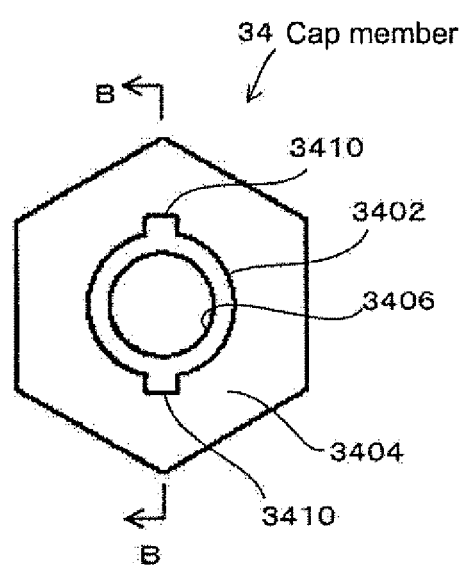

ELECTRIC POWER GENERATING APPARATUS

BACKGROUND OF THE INVENTION

1. Field of the Invention

The present invention relates to an electric power generating apparatus for manually performing an operation of generating electric power.

2. Description of the Related Art

There have been provided portable electronic apparatuses such as a portable music player, a mobile phone, a flashlight, and a portable game machine, which include as a power source an electric power generating apparatus that performs electric power generation by a manual operation.

As the electric power generating apparatus described above, there has been proposed an electric power generating apparatus in which a solenoid coil is wound around the outer circumference of a nonmagnetic tube-like case and a permanent magnet is reciprocated in the tube-like case, thereby generating electric power based on the Faraday's law (see, Japanese Patent Application Laid-open Nos. HEI 10-174411, 2002-374661, 2002-281727, 2005-33917, 2006-296144, and 2005-94832).

When generating the electric power by using the electric power generating apparatus, a user grabs an electronic apparatus in which the electric power generating apparatus is incorporated and reciprocates the electronic apparatus with the user's arm, thereby reciprocating a permanent magnet in a solenoid coil.

SUMMARY OF THE INVENTION

However, in the electric power generating apparatus in related art as described above, when the electric power generating apparatus is reciprocated, it is difficult to estimate speed and strength as a measure for reciprocating the electric power generating apparatus.

For this reason, inconvenient situations arise in that the speed or strength of the reciprocation may be too small to obtain a sufficient amount of electric power or may be too large and make a user's arm tired, for example. This is disadvantageous for improving ease of use.

In view of the above-mentioned circumstances, it is desirable to provide an electric power generating apparatus that is excellent in user-friendliness and advantageous for efficiently generating electric power.

According to an embodiment of the present invention, there is provided an electric power generating apparatus including a casing, a permanent magnet, a coil, an electric circuit unit, a detection unit, and a sound generation unit. The casing includes an interior space. The permanent magnet is provided in the interior space and capable of being reciprocated. The coil is provided on an outer periphery of the interior space. The electric circuit unit outputs a voltage, as an electric energy, generated in the coil by reciprocating the permanent magnet. The detection unit detects a characteristic of the voltage. The sound generation unit generates sound that is associated with at least one of a period and amplitude of the voltage based on a result of detection by the detection unit.

Further, according to another embodiment of the present invention, there is provided an electric power generating apparatus including a mechanical vibration means, a piezoelectric means, an electric circuit unit, a detection unit, and a sound generation unit. The mechanical vibration means includes a free end that functions as an anti-node of a free vibration and a support end that supports the free end and functions as a node of the free vibration. The piezoelectric means is provided at a point of application positioned between the free end and the support end of the mechanical vibration means and is pressurized by a vibration of the mechanical vibration means. The electric circuit unit outputs a voltage, as an electric energy, generated in the piezoelectric means due to a strain caused by pressurization. The detection unit detects a characteristic of the voltage. The sound generation unit generates sound that is associated with at least one of a period and amplitude of the voltage based on a result of detection by the detection unit.

According to the embodiments of the present invention, it is possible to generate the sound that is associated with at least one of the period and the amplitude of the voltage based on the detection result of the characteristic of the voltage generated by reciprocating the electric power generating apparatus.

Therefore, it is possible to adjust the speed or strength of the reciprocation of the electric power generating apparatus while listening to the sound so as to efficiently generate electric power, which is advantageous for efficiently generating the electric power with excellent usability.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4A is a front view of an intermediate member, and FIG. 4B is a side view of the intermediate member viewed in a direction of the arrow B of FIG. 4A;

FIG. 5A is a front view of a cap member, and FIG. 5B is a cross-sectional view of the cap member taken along the line B-B of FIG. 5A;

DESCRIPTION OF PREFERRED
EMBODIMENTS

First Embodiment

First, embodiments of the present invention will be described with reference to the drawings.

Figure 1:
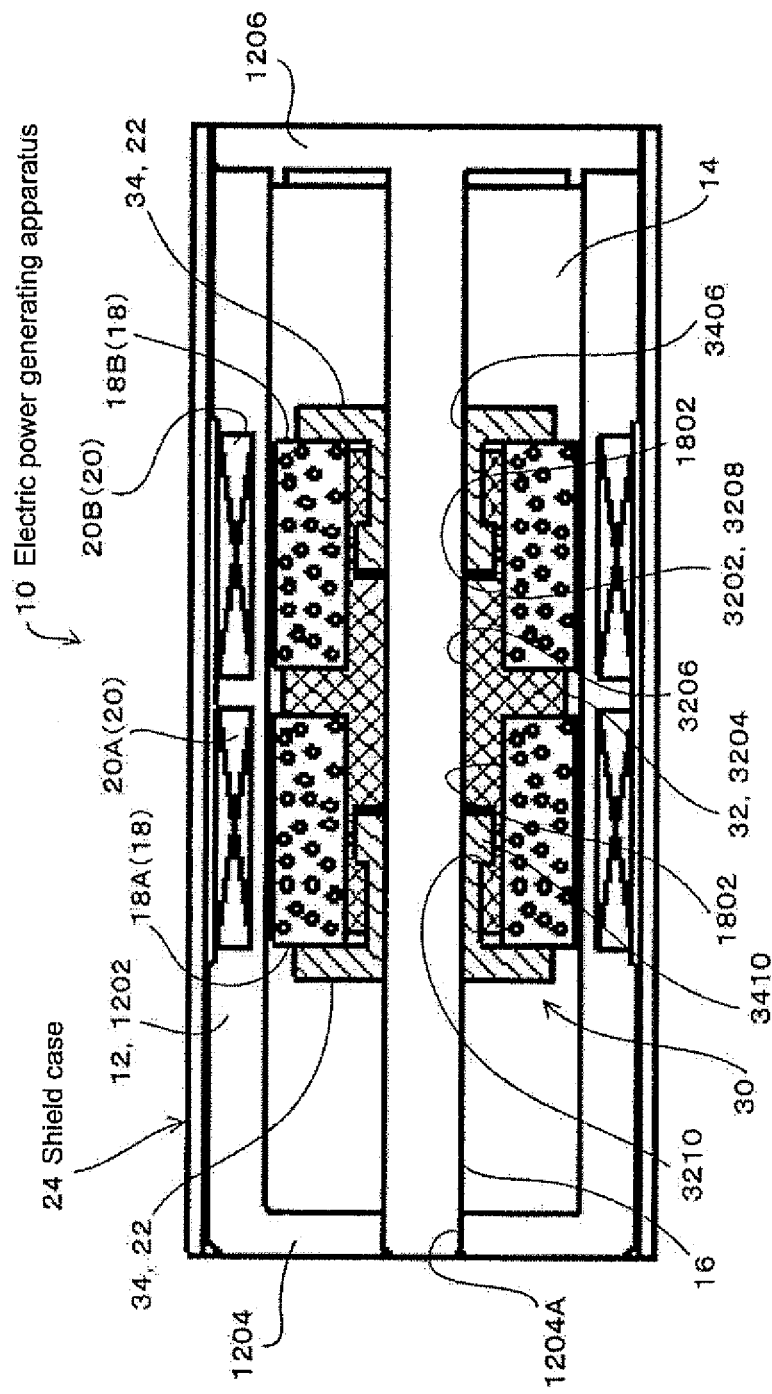
FIG. 1 is a cross-sectional view showing a structure of an electric power generating apparatus according to a first embodiment.

FIG. 1 is a cross-sectional view showing a structure of an electric power generating apparatus 10 according to a first embodiment.

Figure 2:
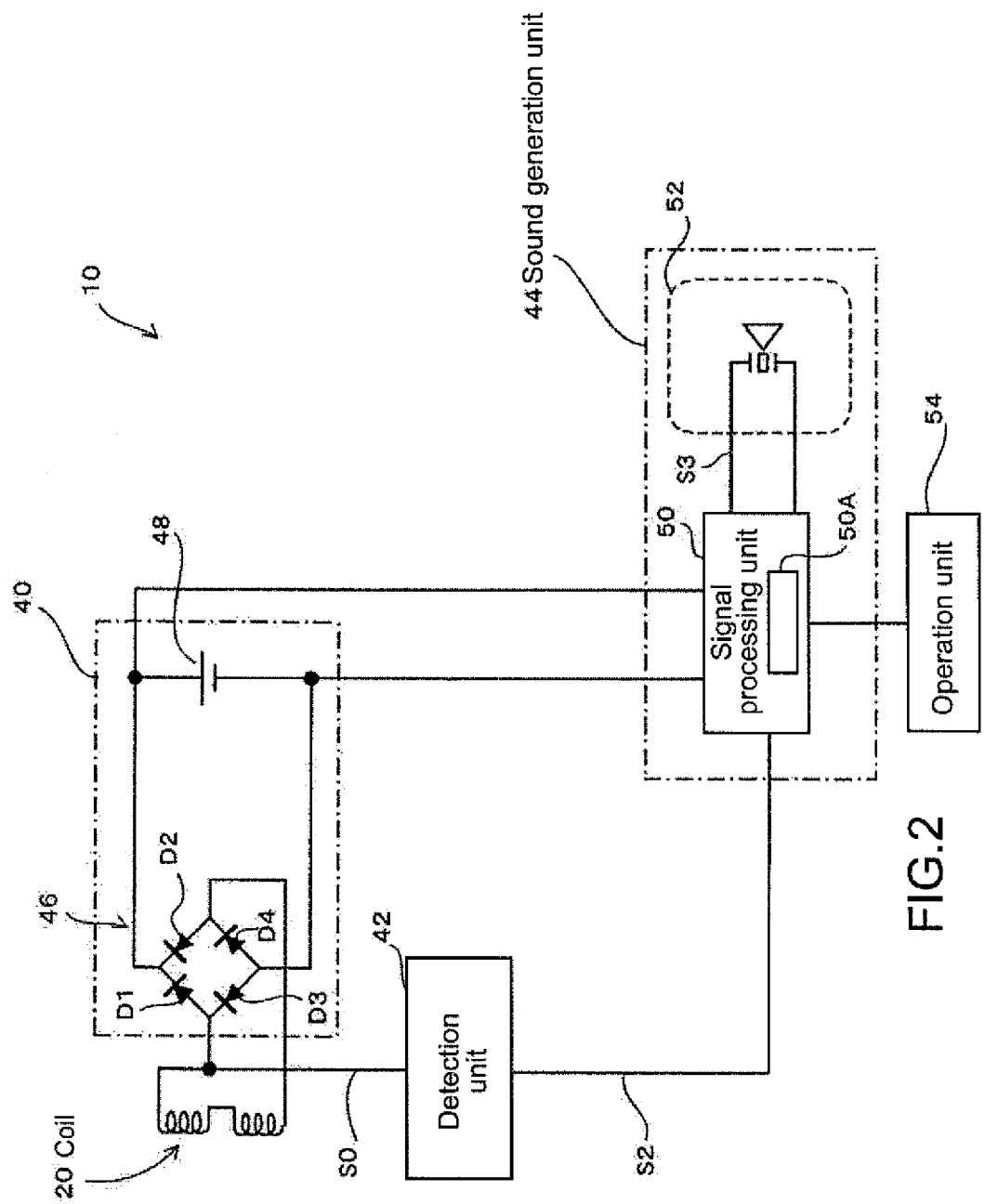
FIG. 2 is a block diagram showing the structure of the electric power generating apparatus.
Figure 3:
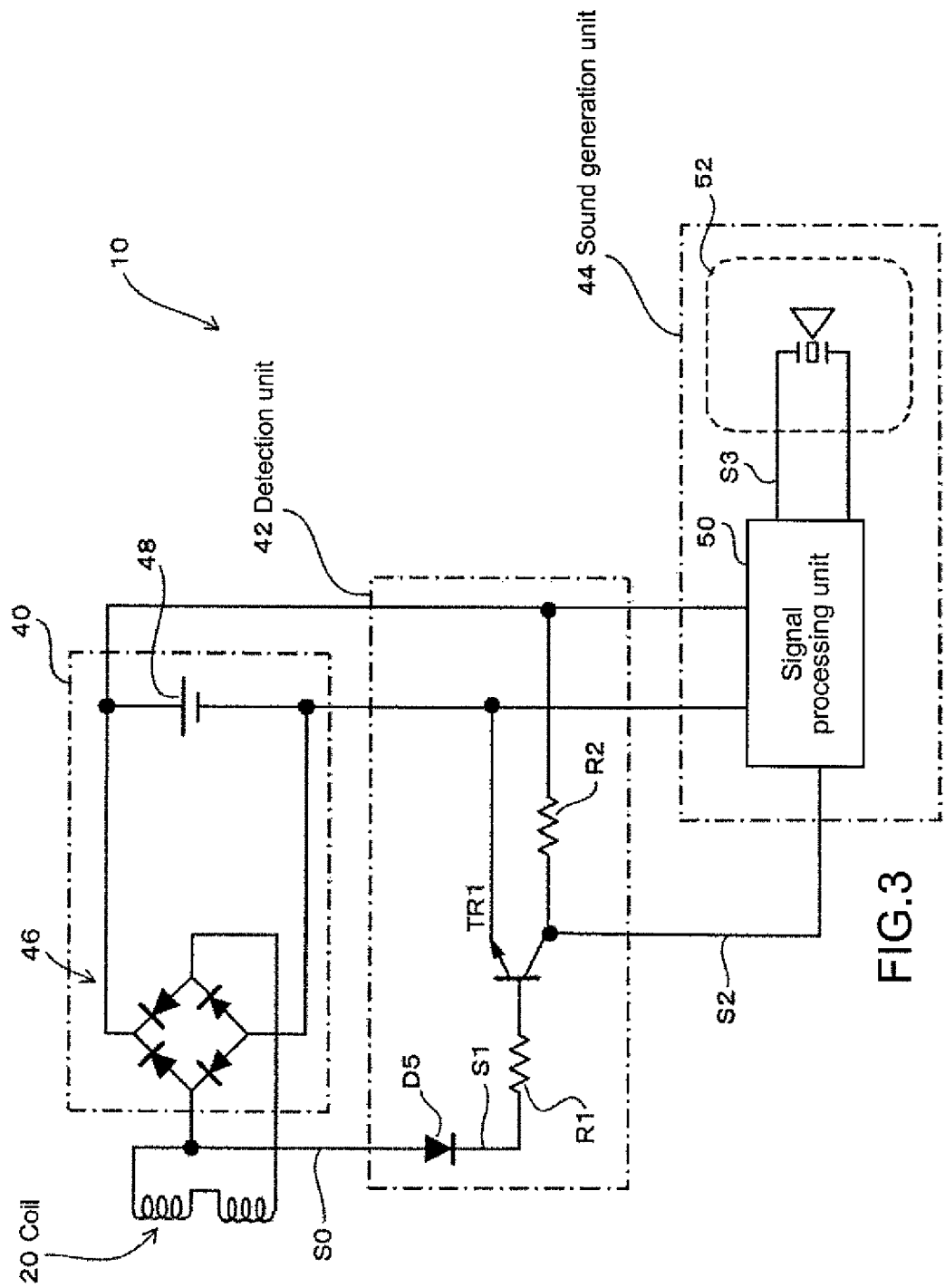
FIG. 3 is a block diagram showing a specific example of the electric power generating apparatus.

FIG. 2 is a block diagram showing the structure of the electric power generating apparatus 10, and FIG. 3 is a block diagram showing a specific example of the electric power generating apparatus 10.

The electric power generating apparatus 10 includes a casing 12, a space portion (interior space) 14, a guide shaft 16, a permanent magnet 18, a coil 20, a buffer member 22, and a shield case 24 that are shown in FIG. 1, and further includes an electric circuit unit 40, a detection unit 42, and a sound generation unit 44 that are shown in FIG. 2.

The casing 12 is made of a nonmagnetic, nonconductive material. In this embodiment, the casing 12 is made of a synthetic resin.

In this embodiment, the casing 12 includes a tube portion 1202, a first end face wall 1204, and a second end face wall 1206. The tube portion 1202 has a circular cross section and has a length longer than an outer diameter thereof. The first end face wall 1204 has a circular shape and blocks one end of the tube portion 1202 in a longitudinal direction, and the second end face wall 1206 has a circular shape and blocks the other end of the tube portion 1202 in the longitudinal direction.

The first end face wall 1204 is integrally formed with the tube portion 1202, and the second end face wall 1206 is integrally formed with the guide shaft 16. The second end face wall 1206 is attached to an opening portion formed at the other end of the tube portion 1202.

The space portion 14 is formed in the casing 12. A lateral cross-sectional area of the space portion 14 is larger than a longitudinal cross-sectional area thereof, and the space portion 14 is laterally long. In this embodiment, the space portion 14 has a cylindrical shape.

The guide shaft 16 is supported by the casing 12 and extended in the longitudinal direction of the space portion 14 in a state where a shaft center of the guide shaft 16 and an axis center of the space portion 14 are coincided with each other.

The guide shaft 16 is made of a nonmagnetic, nonconductive material and formed into a cylindrical shape.

The second end face wall 1206 is integrally formed with an end of the guide shaft 16, and the other end of the guide shaft 16 is inserted through a hole 1204A formed in the center of the first end face wall 1204 and fixed thereto.

The permanent magnet 18 can be reciprocated with respect to the guide shaft 16 and is provided so as not to rattle in a radial direction of the guide shaft 16.

The permanent magnet 18 is constituted of a first permanent magnet 18A and a second permanent magnet 18B in this embodiment.

The first and second permanent magnets 18A and 18B have a hollow circular cylindrical form of the same size and shape, and a hollow 1802 is formed in an inner circumferential portion of each of the first and second permanent magnets 18A and 18B.

To both ends of the first and second permanent magnets 18A and 18B in a longitudinal direction thereof, a north pole and a south pole are respectively provided.

In this embodiment, portions in the first and second permanent magnets 18A and 18B, which are close to each other, are magnetized to have the same magnetic pole.

Outer diameters of the first and second permanent magnets 18A and 18B are set to be smaller than an inner diameter of the tube portion 1202, and thus a gap is ensured between an outer circumferential surface of the first and second permanent magnets 18A and 18B and an inner circumferential surface of the casing 12 that forms the space portion 14.

The first and second permanent magnets 18A and 18B are held by a holding member 30.

As shown in FIG. 1, the holding member 30 holds the first and second permanent magnets 18A and 18B and includes an intermediate member 32 and a cap member 34.

The intermediate member 32 and the cap member 34 are each formed of a nonmagnetic material.

FIG. 4A is a front view of the intermediate member 32, and FIG. 4B is a side view of the intermediate member 32 viewed in a direction of the arrow B of FIG. 4A. FIG. 5A is a front view of the cap member 34, and FIG. 5B is a cross-sectional view of the cap member 34 taken along the line B-B of FIG. 5A.

As shown in FIG. 1 and FIGS. 4A and 4B, the intermediate member 32 includes a tube portion 3202 and a flange portion 3204.

The tube portion 3202 has a circular tube shape. In an inner circumferential portion of the tube portion 3202, a hole 3206 through which the guide shaft 16 is inserted is formed, and on an outer circumferential portion thereof, an outer circumferential surface 3208 to which the permanent magnet 18 is attached is formed.

The flange portion 3204 is provided so as to protrude from an intermediate portion in a longitudinal direction of the outer circumferential surface 3208.

At both ends of the intermediate member 32 in a length direction thereof, engagement grooves 3210 are formed.

The engagement grooves 3210 include opening portions, linear portions, and arc portions. The opening portions are opened on the end surfaces of the intermediate member 32 in the length direction. The linear portions are extended from the opening portions in the length direction of the intermediate member 32. The arc portions are extended in a circumferential direction at the ends of the linear portions.

In the engagement grooves 3210, engagement protrusions 3410 (FIGS. 5A and 5B) of the cap member 34 are inserted from the opening portions to the linear portions. Subsequently, the cap member 34 is rotated, thereby inserting the engagement protrusions 3410 into the arc portions, with the result that the cap member 34 is attached to the intermediate member 32 so as not to fall off.

As shown in FIG. 1 and FIGS. 5A and 5B, the cap member 34 includes a tube portion 3402 and a guard portion 3404.

The tube portion 3402 has a circular tube shape. In the tube portion 3402, a hole 3406 through which the guide shaft 16 is inserted is formed. The engagement protrusions 3410 are formed at an end of the tube portion 3402.

In this embodiment, at least one of the hole 3206 of the intermediate member 32 and the hole 3406 of the cap member 34 is slidably connected with the guide shaft 16.

The guard portion 3404 is protruded from the longitudinal end of the tube portion 3402, which is opposed to the engagement protrusions 3410, and holds the permanent magnet 18 attached to the outer circumferential surface 3208 in cooperation with the flange portion 3204.

As shown in FIG. 1, the buffer member 22 absorbs an impact caused by a collision of the permanent magnet 18 with the casing 12 in the longitudinal direction of the guide shaft 16 when the first and second permanent magnets 18A and 18B held by the holding member 30 are reciprocated along the guide shaft 16.

In this embodiment, the buffer member 22 is constituted of the guard portions 3404 of two cap members 34.

As shown in FIG. 1, the coil 20 is disposed on an outer circumference of the space portion 14 in the longitudinal direction of the space portion 14, and the permanent magnet 18 passes through the inside of the coil 20. In this embodiment, the coil 20 is formed by serially connecting a first coil 20A and a second coil 20B.

The first and second coils 20A and 20B are disposed at positions on an outer circumferential surface of the casing 12, which sandwich the longitudinal center of the tube portion 1202 of the casing 12 and are separated by the same distance from the longitudinal center thereof.

The shield case 24 is made of a magnetic material and covers an outer surface of the casing 12. As the magnetic material, a material obtained by performing sheet-metal processing on a plate material such as a cold-rolled steel (SPC material) may be arbitrarily used.

In this embodiment, the shield case 24 is formed into a circular tube shape so that the shield case 24 entirely covers the tube portion 1202 excluding the first and second end face walls 1204 and 1206 in the outer surface of the casing 12.

(Description on Assembling Operation)

Next, a description will be given on assembly of parts except the electric circuit unit 40, the detection unit 42, and the sound generation unit 44 in the electric power generating apparatus 10.

In advance, the first and second coils 20A and 20B are provided to the tube portion 1202 of the casing 12, and the shield case 24 is attached on the outer circumferential surface of the tube portion 1202.

In addition, the electric circuit unit 40 is electrically connected with the first and second coils 20A and 20B.

The first and second permanent magnets 18A and 18B are provided to the holding member 30.

That is, the first and second permanent magnets 18A and 18B are provided to the intermediate member 32, and thereafter the cap member 34 is provided to the intermediate member 32.

In this case, the portions at which the first and second permanent magnets 18A and 18B are close to the flange 3208 of the intermediate member 32 are magnetized to have the same magnetic pole. Therefore, a repulsion force acts between the first and second permanent magnets 18A and 18B.

The repulsion force pushes the engagement protrusions 3410 against the arc portions of the engagement grooves 3210, with the result that the cap member 34 is reliably held without being falling off from the intermediate member 32.

In this way, when the holding member 30 is provided with the first and second permanent magnets 18A and 18B, the guide shaft 16 is inserted through the hole 3206 of the intermediate member 32 and the hole 3406 of the cap member 34.

Subsequently, the end of the guide shaft 16 is inserted through the hole 1204A of the first end face wall 1204, and the second end face wall 1206 is attached and fixed to the opening portion of the tube portion 1202.

In this way, the assembling operation is completed.

Next, a description will be given on the electric circuit unit 40, the detection unit 42, and the sound generation unit 44 that are the main points of the present invention.

As shown in FIG. 2, the electric circuit unit 40 outputs as electric energy an alternating-current voltage generated in the coil 20 by the reciprocation of the permanent magnet 18, that is, an electromotive force.

The electric circuit 40 may be incorporated in the casing 12, or may be structured separately from the casing 12.

In this embodiment, for example, the electric circuit unit 40 includes a rectifier circuit 46 and an electric charge unit 48. The rectifier circuit 46 rectifies the alternating-current voltage (alternating current) generated in the coil 20, and the electric charge unit 48 charges a direct-current voltage obtained by the rectifier circuit 46 and outputs the voltage as the electric energy (electric power).

In addition, the electric charge unit 48 is connected to a power source input terminal of an electronic apparatus in which the electric power generating apparatus 10 is incorporated, and the electric power from the electric charge unit 48 is supplied to the electronic apparatus via the power source input terminal.

For the rectifier circuit 46, various rectifier circuits publicly known such as the rectifier circuit including four diodes D1 to D4 for rectification can be used as shown in FIG. 2.

For the electric charge unit 48, various secondary batteries or capacitors publicly known may be used.

The detection unit 42 detects a characteristic of the voltage generated in the coil 20 and supplies, to the sound generation unit 44, a detection result thus obtained.

The characteristic of the voltage detected by the detection unit 42 is at least one of a period and amplitude of the voltage.

FIG. 3 is a diagram showing a structural example in a case where the detection unit 42 detects the period of the voltage as the characteristic of the voltage.

As shown in FIG. 3, the detection unit 42 includes a diode D5, a transistor TR1, a first resistor R1, and a second resistor R2.

In the diode D5, an anode is connected to one end of the coil 20, and a cathode is connected to a base of the transistor TR1 via the first resistor R1.

An emitter of the transistor TR1 is connected to an anode of the electric charge unit 48.

A collector of the transistor TR1 is connected to a positive electrode of the electric charge unit 48 via the second resistor R2 and connected to an input terminal of a signal processing unit 50.

Figure 6A:
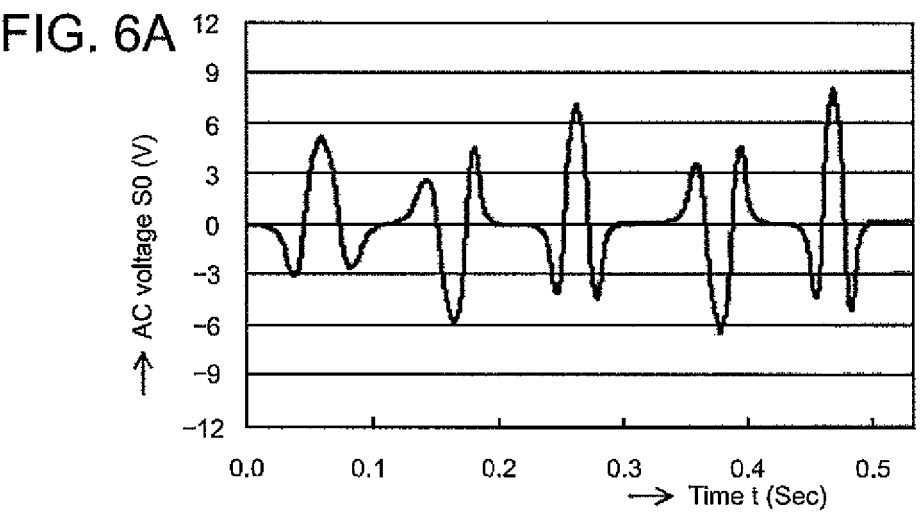
FIG. 6A is a waveform diagram of an alternating-current (AC) voltage.
Figure 6B:
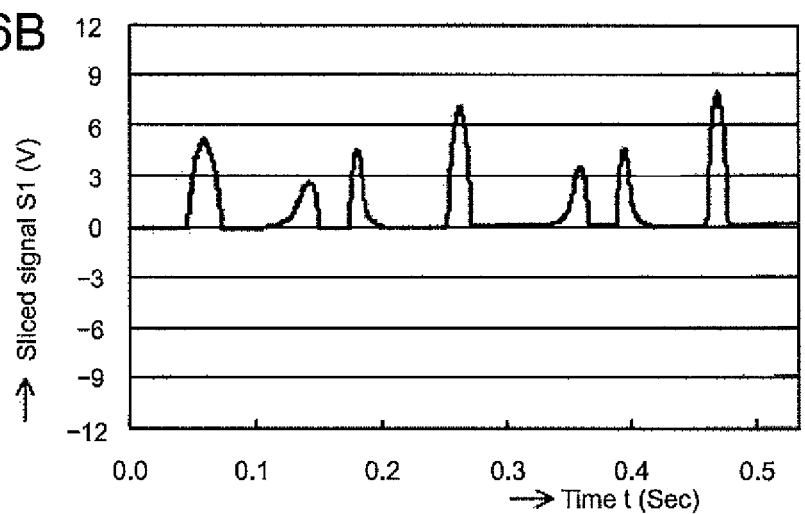
FIG. 6B is a waveform diagram of a sliced signal.
Figure 6C:
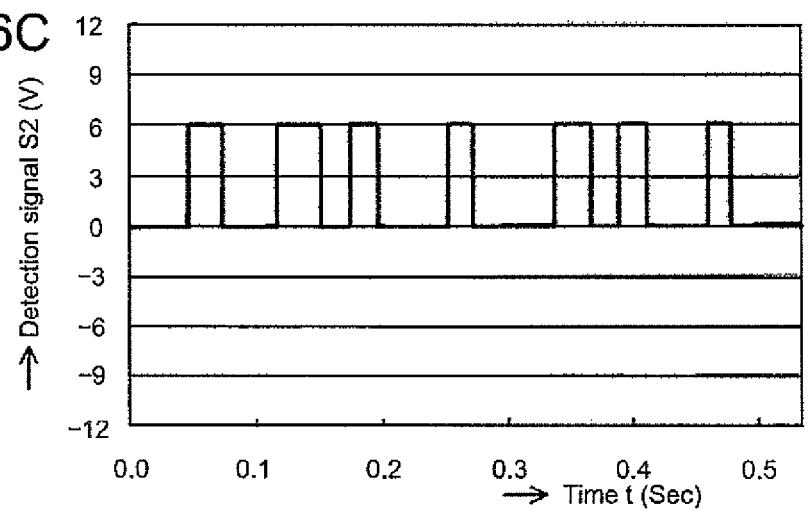
FIG. 6C is a waveform diagram of a detection signal.

A description will be given on an operation of the detection unit 42 with reference to FIGS. 6A, 6B, and 6C.

An alternating-current (AC) voltage S0 that is an electric generation voltage generated in the coil 20 is converted to a signal S1 sliced by the diode D5. The signal S1 is supplied to the base of the transistor TR1 via the first resistor R1.

Thus, the sliced signal S1 is amplified by the transistor TR1, and therefore a pulse signal that is binarized to have an "H" level and an "L" level is output from the collector and is supplied to the signal processing unit 50 as a detection signal S2.

A period of the detection signal S2 corresponds to the period of the AC voltage S0.

Based on the detection result obtained by the detection unit 42, the sound generation unit 44 generates sound that is associated with at least one of the period and the amplitude of the voltage generated in the coil 20. In this embodiment, the sound generation unit 44 generates a buzz as the sound, for example.

The sound generation unit 44 includes the signal processing unit 50 and a speaker 52.

The signal processing unit 50 generates a sound signal S3 that is associated with the period of the detection signal S2 and supplies the sound signal S3 to the speaker 52.

For example, the shorter the period of the detection signal S2, the higher the frequency of the sound signal S3 generated by the signal processing unit 50 becomes. The longer the period of the detection signal S2, the lower the frequency of the sound signal S3 generated by the signal processing unit 50.

The signal processing unit 50 as described above can be formed by various electronic circuits publicly known such as a one-chip microcomputer, for example.

The speaker 52 is driven by the sound signal S3 supplied from the signal processing unit 50, thereby generating the sound.

It should be noted that the signal processing unit 50 operates based on the electric power supplied through the positive and negative electrodes of the electric charge unit 48.

Next, a description will be given on an effect of the operation of the electric power generating apparatus 10.

The electric power generating apparatus 10 according to this embodiment is incorporated in portable electronic apparatuses such as a portable music player, a mobile phone, a flashlight, and a portable game machine in advance.

The electronic apparatus is grabbed when used, and reciprocated in the longitudinal direction of the casing 12 of the electric power generating apparatus 10 with a user's arm.

Through the reciprocation of the electronic apparatus, the permanent magnet 18 is reciprocated in the coil 20, and the AC voltage S0 generated in the coil 20 is supplied to the electronic apparatus as the electric energy by the electric circuit unit 40, thereby operating the electronic apparatus.

Figure 7A:
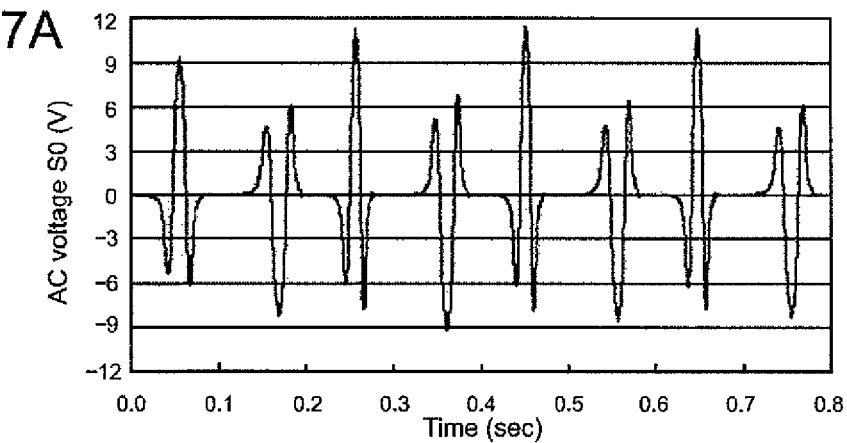
FIGS. 7A, 7B, and 7C are waveform diagrams each showing an example of a result obtained by measuring the AC voltage (generated power voltage) generated from a coil by reciprocating the electric power generating apparatus.
Figure 7B:
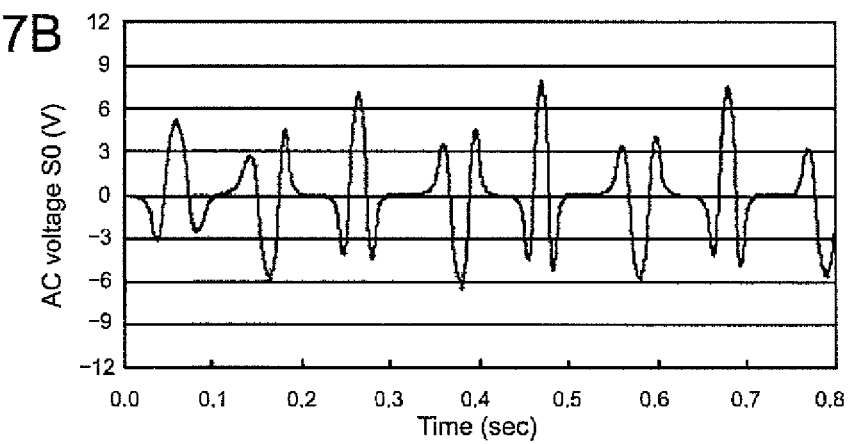
Figure 7C:
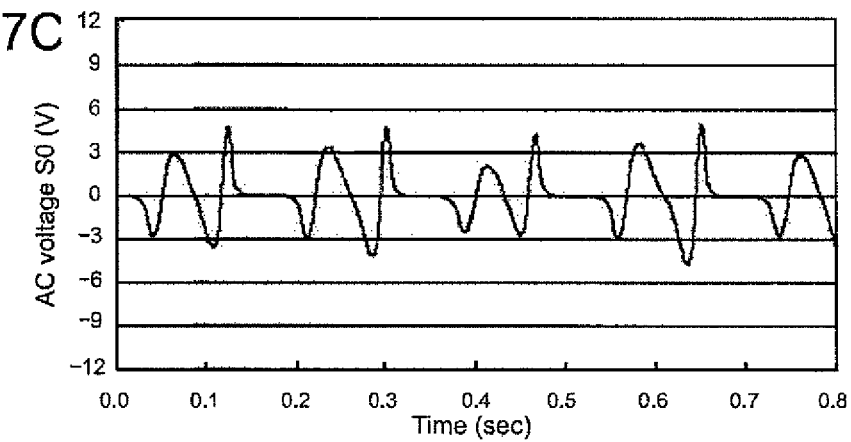

FIGS. 7A, 7B, and 7C are waveform diagrams each showing an example of a result obtained by measuring the AC voltage S0 (generation power voltage) generated from the coil 20 by reciprocating the electric power generating apparatus 10.

The shorter a period of the waveform, the higher the speed of the reciprocation of the electric power generating apparatus 10 becomes.

Further, the larger the amplitude of the waveform, the higher the acceleration of the reciprocation of the electric power generating apparatus 10 becomes, that is, the larger the force used for the reciprocation thereof.

The amount of electric power generated by the electric power generating apparatus 10 corresponds to an integration value of the waveform, that is, an area surrounded by the waveform and a lateral axis that indicates 0 V.

Accordingly, as the speed and the acceleration of the reciprocation of the electric power generating apparatus 10 become higher, the amount of electric power generated becomes larger, which can efficiently generate the electric power.

Specifically, FIG. 7A shows a case where the electric power generating apparatus 10 is reciprocated at the highest speed and acceleration and the largest amount of electric power generated by the electric power generating apparatus 10 is obtained among cases shown in FIGS. 7A to 7C.

FIG. 7B shows a case where the electric power generating apparatus 10 is reciprocated at middle speed and acceleration and the moderate amount of the electric power generated by the electric power generating apparatus 10 is obtained among cases shown in FIGS. 7A to 7C.

FIG. 7C shows a case where the electric power generating apparatus 10 is reciprocated at the lowest speed and acceleration and the smallest amount of the electric power generated by the electric power generating apparatus 10 is obtained among cases shown in FIGS. 7A to 7C.

In this embodiment, the sound generated from the sound generation unit 44 has the highest frequency in the case of FIG. 7A, a middle frequency in the case of FIG. 7B, and the lowest frequency in the case of FIG. 7C.

Therefore, the user can adjust the speed at which the electric power generating apparatus 10 is reciprocated so as to efficiently generate electric power based on the degree of the frequency of the sound generated from the sound generation unit 44.

That is, in the case where the sound generation unit 44 generates sound at a low frequency, it is possible to recognize that the speed of the reciprocation is low, and in the case where the sound generation unit 44 generates sound at a high frequency, it is possible to recognize that the speed of the reciprocation is high.

Therefore, by adjusting the speed of the reciprocation so that the frequency of the sound generated by the sound generation unit 44 is set to be middle, the electric power can be efficiently and continuously generated for a long time period. In other words, the speed or strength of the reciprocation can be adjusted so that the electric power can be efficiently and continuously generated.

Accordingly, it is possible to avoid an inconvenience in that the speed of the reciprocation is too low to obtain the sufficient electric power or that the speed of the reciprocation is so high that the user's arm is made tired immediately, which is advantageous for improving ease of use.

In addition, when the electric power generating apparatus 10 is reciprocated, the frequency of the sound generated from the sound generation unit 44 varies depending on the speed of the reciprocation. Therefore, the user can feel that generating the electric power itself is fun and thus can reciprocate the electric power generating apparatus 10 without getting tired of this operation.

Thus, unlike apparatuses in related art, the electric power generating apparatus 10 can have added value such as a sense of fun or entertainingness, with the result that it is highly advantageous for upgrading a commercial value of the electric power generating apparatus 10.

In this embodiment, described is the case where the sound generation unit 44 generates the sound whose frequency is higher based on the detection result obtained by the detection unit 42, as the period of the voltage generated in the coil 20 is shorter.

However, in a case where the sound generation unit 44 generates sound associated with the amplitude of the voltage generated in the coil 20 based on the detection result obtained by the detection unit 42, the same effect can also be obtained. For example, in a case of generating the sound whose frequency is higher, as the amplitude of the voltage generated in the coil 20 is larger, the same effect can also be obtained.

In this case, the user can adjust the acceleration (strength) at the time when the electric power generating apparatus 10 is reciprocated based on the degree of the frequency of the sound generated by the sound generation unit 44 so as to efficiently generate the electric power.

Further, in this case, the frequency of the sound generated from the sound generation unit 44 varies depending on the acceleration of the reciprocation of the electric power generating apparatus 10.

In addition, in a case where the sound generation unit 44 generates, based on the detection result obtained by the detection unit 42, the sound associated with both the period and the amplitude of the voltage generated in the coil 20, the same effect can also be obtained. That is, in a case of generating the sound whose frequency is higher, as the period of the voltage generated in the coil 20 is shorter or as the amplitude thereof is larger, the same effect can also be obtained.

In this case, the user can adjust both the speed and the acceleration (strength) at the time when the electric power generating apparatus 10 is reciprocated based on the degree of the frequency of the sound generated by the sound generation unit 44 so as to efficiently generate the electric power.

Further, in this case, the frequency of the sound generated from the sound generation unit 44 varies depending on both the speed and the acceleration of the reciprocation of the electric power generating apparatus 10.

Although the description is given on the case where the sound generation unit 44 generates the buzz in this embodiment, a modified example as described below can be adopted.

The sound generated by the sound generation unit 44 may be music (melody) or a song instead of the simple buzz.

In this case, the sound generation unit 44 may change the frequency of the sound generated based on the period or amplitude of the voltage generated in the coil 20, or may change a tempo of the melody or song based on the period or amplitude of the voltage generated in the coil 20.

In this case, the added value such as a sense of fun or entertainingness given to the electric power generating apparatus 10 can be further upgraded, with the result that it is highly advantageous for further upgrading the commercial value of the electric power generating apparatus 10.

Further, referring to FIG. 2 again, it is possible to gradually change the tempo of the music or song generated by the sound generation unit 44, to be selectively generated. The tempo of the music or song generated by the sound generation unit 44 may be selected by operating an operation unit 54 that is connected to the sound generation unit 44. It should be noted that as the operation unit 54, various operation members publicly known such as a switch externally provided to the electronic apparatus can be used.

In this case, the faster the tempo of the music or song, the faster or more strongly the electronic apparatus is reciprocated. Therefore, a time period required for electric charge of the electric charge unit 48 can be further reduced.

In other words, reciprocating the electronic apparatus at the speed or strength while keeping pace with the tempo of the music or song makes it possible to adjust the time period required for charging the electric charge unit 48 with enjoyment.

Thus, the added value such as a sense of fun or entertainingness given to the electric power generating apparatus 10 can be further upgraded, which is more advantageous for further upgrading the commercial value of the electric power generating apparatus 10.

Further, a plurality of kinds of the sound, music, or song can be selectively generated from the sound generation unit 44, and kinds of the sound, music, or song generated by the sound generation unit 44 may be selected by operating the operation unit 54 connected to the sound generation unit 44.

In this case, the user can select the sound to suit a preference of the user, so it is more advantageous for upgrading the commercial value of the electric power generating apparatus 10.

Further, the sound generated by the sound generation unit 44 may be human voice.

Referring FIG. 2 again, it is possible to provide to the signal processing unit 50 a speech synthesis unit 50A that generates human voice through speech synthesis, and the human voice may be generated from the sound generation unit 44 by using the speech synthesis unit 50A. For the speech synthesis unit 50A, various speech synthesis circuits publicly known may be used.

In this case, the human voice generated from the sound generation unit 44 based on the period or amplitude of the voltage generated in the coil 20 is set to phrases for urging the user to adjust the speed and the acceleration (strength) of the reciprocation of the electric power generating apparatus 10 to an appropriate range, that is, the phrases of "faster", "best", "too much" are set, for example.

In this case, it is possible to more reliably avoid an inconvenience in that the speed of the reciprocation is too low to obtain the sufficient electric power or that the speed of the reciprocation is so high that the user's arm is made tired immediately, which is advantageous for improving ease of use.

In addition, a volume of the sound generated by the sound generation unit 44 may be changed based on at least one of the period and the amplitude of the voltage generated in the coil 20.

Specifically, the sound generation unit 44 generates, based on the detection result obtained by the detection unit 42, sound at a larger volume, as the period of the voltage generated in the coil 20 becomes shorter or as the amplitude of the voltage generated in the coil 20 becomes larger.

In this case, the user can adjust at least one of the speed and the acceleration (strength) of the reciprocation of the electric power generating apparatus 10 so as to efficiently generate the electric power based on the volume of the sound generated from the sound generation unit 44.

In addition, both the frequency and the volume of the sound generated by the sound generation unit 44 may be changed depending on at least one of the period and the amplitude of the voltage generated in the coil 20.

In this case, based on both the degree of the frequency of the sound generated from the sound generation unit 44 and the sound volume therefrom, it is possible to adjust at least one of the speed and the acceleration (strength) of the reciprocation of the electric power generating apparatus 10 so that the electric power can be efficiently generated.

Second Embodiment

Next, a second embodiment will be described.

In the second embodiment, the electric power generating apparatus 10 has an outline of a commercially available primary battery or secondary battery.

Figure 8:
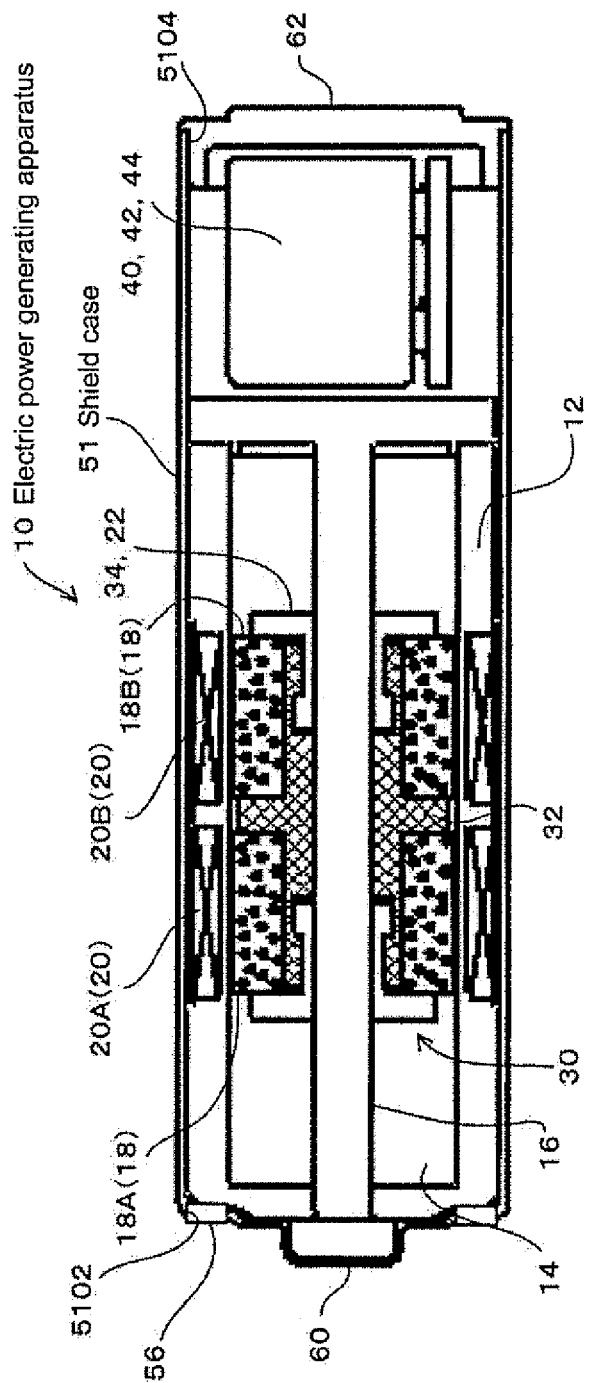
FIG. 8 is a cross-sectional view of an electric power generating apparatus according to a second embodiment.
Figure 9:
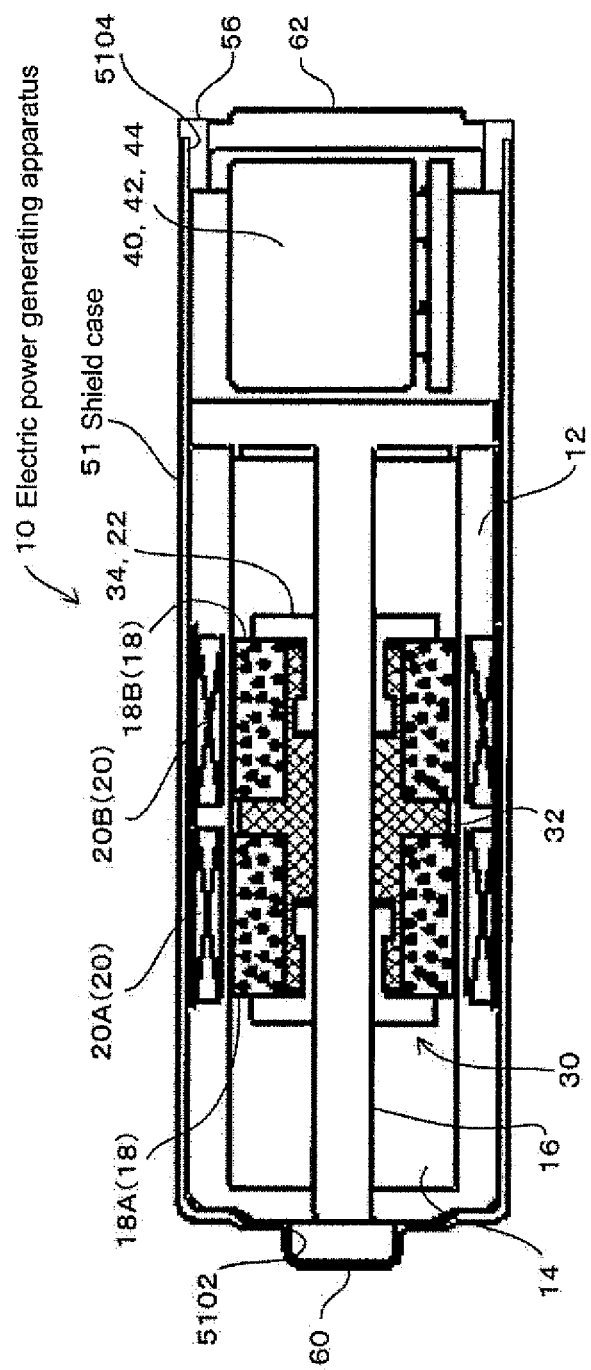
FIG. 9 is a cross-sectional view showing a modified example of the electric power generating apparatus according to the second embodiment.

FIGS. 8 and 9 each are a cross-sectional view of the electric power generating apparatus 10. It should be noted that in this embodiment and subsequent ones, portions that are the same as or correspond to those of the first embodiment are denoted by the same reference numerals or symbols, and their descriptions will be omitted.

As shown in FIG. 8, as in the first embodiment, the electric power generating apparatus 10 includes the casing 12, the space portion 14, the guide shaft 16, the permanent magnet 18, the coil 20, the buffer member 22, a shield case 51, the electric circuit unit 40, the detection unit 42, and the sound generation unit 44 (those three units are shown in FIG. 2).

The electric power generating unit 10 has the same shape as the outline of the commercially available primary battery or secondary battery.

A positive-electrode terminal portion 60 and a negative-electrode terminal portion 62 are provided at the same positions in the same shape as those of the commercially available primary battery or secondary battery.

In this embodiment, the electric power generating apparatus 10 is formed to have the same outline as a commercially available AA dry battery.

An electric energy is output by the electric circuit unit 40 through the positive-electrode terminal portion 60 and the negative-electrode terminal portion 62.

A detailed description will be given on the outline of the electric power generating apparatus 10. The entire outline thereof may be formed in accordance with the shape and size standard of a battery, which is specified in Japanese Industrial Standards.

That is, the entire outline of the electric power generating apparatus 10 may be corresponded to the outline of a manganese dry battery or an alkaline dry battery specified in JIS C8501: 2004 (in particular, item numbers 8 to 10) or JIS C8511: 2004 (in particular, item numbers 8 to 10).

It is more particularly desirable to form the outline corresponding to the outline of the manganese dry battery or the alkaline dry battery specified in the appendix table 1 of JIS C8501: 2004 or JIS C8511: 2004. This is because the above-mentioned type battery is widely used as manganese dry batteries or alkaline dry batteries.

It should be noted that, within a range in which a maximum value of the outline size does not exceed the standard, the outline size may be partly smaller than a minimum value of the standard, as long as the outline size mostly falls within the range of the standard.

More specifically, the shield case 51 forms an exterior of the electric power generating apparatus 10, and the electric circuit unit 40, the detection unit 42, the sound generation unit 44, and the casing 12 are stored in the shield case 51.

The positive-electrode terminal portion 60 is exposed to outside of the shield case 51 from an opening portion 5102 formed at one longitudinal end of the shield case 51.

The negative-electrode terminal portion 62 is exposed to outside of the shield case 51 from an opening portion 5104 formed at the other longitudinal end of the shield case 51.

As shown in FIG. 8, an annular insulating material 56 is provided between the positive-electrode terminal portion 60 and a part of the shield case 51 that rims the one opening portion 5102.

Alternatively, as shown in FIG. 9, the annular insulating member 56 is provided between the negative-electrode terminal portion 62 and a part of the shield case 51 that rims the other opening portion 5104.

In this way, by electrically insulating the shield case 51 from at least one of the positive-electrode terminal portion 60 and the negative-electrode terminal portion 62 by the insulating member 56, the positive-electrode terminal portion 60 and the negative-electrode terminal portion 62 are prevented from being short-circuited through the shield case 51.

According to the second embodiment, the same effect as in the first embodiment can of course be obtained. Further, the outline of the electric power generating apparatus 10 is the same as the shape of the casing of the commercially available primary battery or secondary battery. Therefore, the electric power generating apparatus 10 can be attached to an electronic apparatus and can be used in place of the primary battery or secondary battery.

As a result, the electronic apparatus is equipped with the electric power generating apparatus 10 and can be used without any additional operation, which is advantageous for improving the ease of use.

Third Embodiment

Next, a third embodiment will be described.

The third embodiment is different from the second embodiment in that an exterior case 61 is provided.

Figure 10:
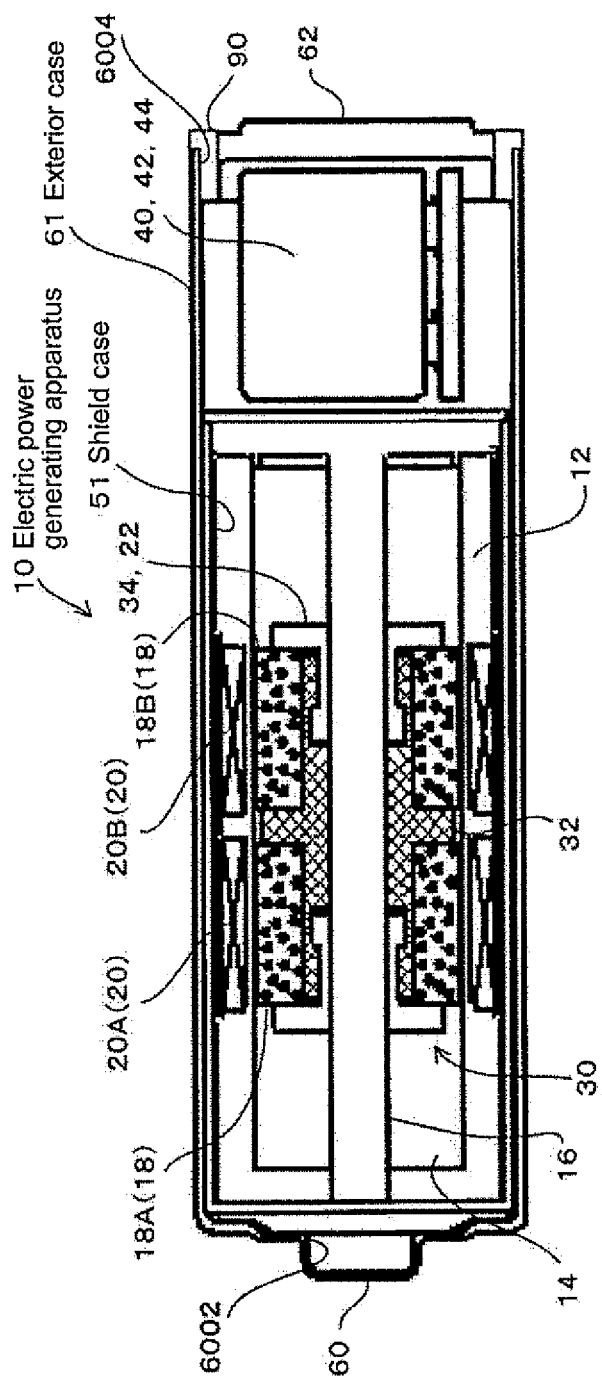
FIG. 10 is a cross-sectional view of an electric power generating apparatus according to a third embodiment.

FIG. 10 is a cross-sectional view of the electric power generating apparatus 10 according to the third embodiment. In the following description, portions that are the same or correspond to those in the second embodiment are denoted by the same reference numerals or symbols.

As shown in FIG. 10, the electric power generating apparatus 10 includes the casing 12, the space portion 14, the guide shaft 16, the permanent magnet 18, the coil 20, the buffer member 22, the shield case 51, the insulating member 56, the electric circuit unit 40, the detection unit 42, and the sound generation unit 44 as in the second embodiment, and further includes the exterior case 61.

In the third embodiment, the exterior case 61 is made of an electrically conductive material such as metal, and forms an exterior of the electric power generating apparatus 10.

The shield case 51, the electric circuit unit 40, the detection unit 42, and the sound generation unit 44 are stored in the exterior case 61.

The positive-electrode terminal portion 60 is exposed to outside of the exterior case 61 from an opening portion 6002 that is formed at one end portion of the exterior case 61.

The negative-electrode terminal portion 62 is exposed to outside of the exterior case 61 from an opening portion 6004 that is formed at the other end portion of the exterior case 61.

An annular insulating material 90 is provided between the negative-electrode terminal portion 62 and a part of the exterior case 61 that rims the opening portion 6004. It should be noted that the annular insulating material 90 may be provided between the positive-electrode terminal portion 60 and a part of the exterior case 61 that rims the opening portion 6002.

In this way, by electrically insulating the exterior case 61 from at least one of the positive-electrode terminal portion 60 and the negative-electrode terminal portion 62 by the insulating member 90, the positive-electrode terminal portion 60 and the negative-electrode terminal portion 62 are prevented from being short-circuited through the exterior case 61.

Further, in a case where the exterior case 61 is formed of an insulating material, the insulating member 90 can be eliminated.

In a case where the exterior case 61 has electrical conductivity, it is necessary to prevent external short-circuiting through the exterior case 61.

Figure 11:
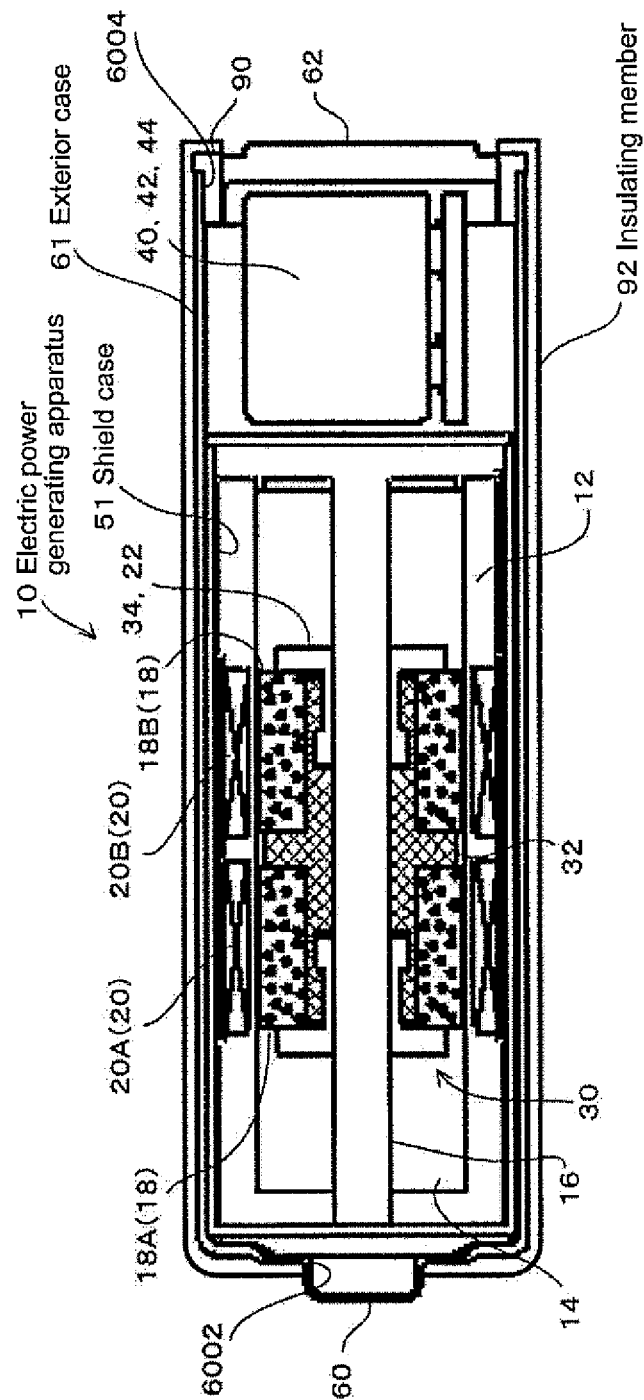
FIG. 11 is a cross-sectional view showing a first modified example of the electric power generating apparatus according to the third embodiment.

Accordingly, as shown in FIG. 11, the exterior case 61 is electrically connected to the positive-electrode terminal portion 60 (or the negative-electrode terminal portion 62) and an insulating member 92 that covers an entire area of the exterior case 61 which is exposed to outside may be provided as in the commercially available alkaline battery.

Figure 12:
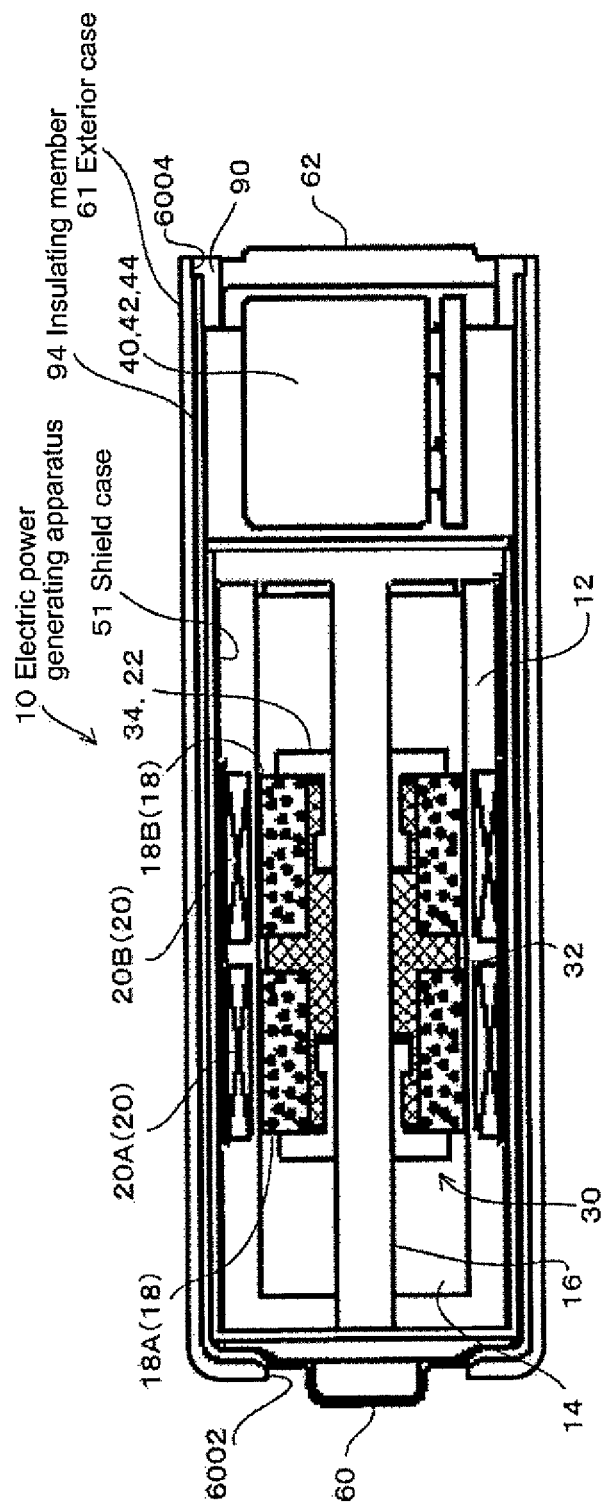
FIG. 12 is a cross-sectional view showing a second modified example of the electric power generating apparatus according to the third embodiment.

Alternatively, as shown in FIG. 12, an insulating member 94 for covering an entire area of the exterior case 61 which faces the inside and electrically insulating the positive-electrode terminal portion 60 and the negative-electrode terminal portion 62 from each other may be provided as in the commercially available manganese battery. In this case, another insulating member that covers the entire area of the exterior case 61 which is exposed to the outside may be additionally provided.

Figure 13:
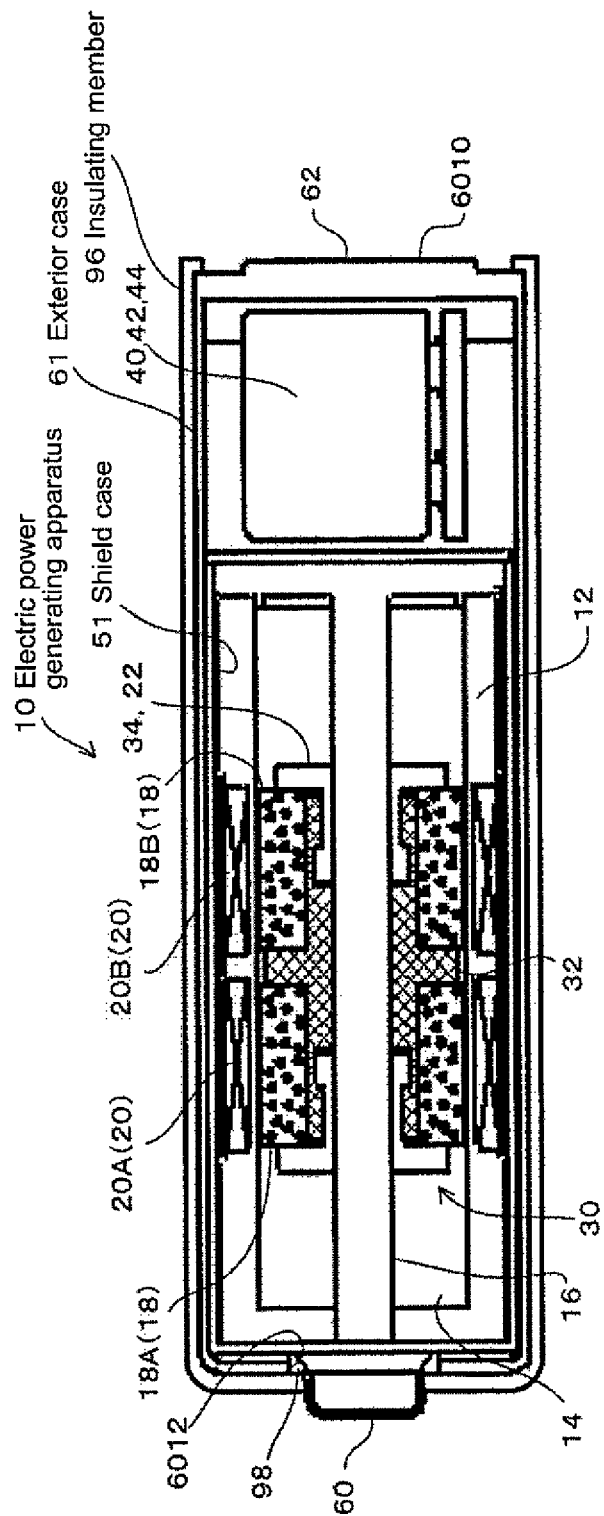
FIG. 13 is a cross-sectional view showing a third modified example of the electric power generating apparatus according to the third embodiment.

Alternatively, a structure shown in FIG. 13 may be used.

That is, the exterior case 61 has a bottomed tube shape, one end in an extended direction of which is blocked by a bottom portion 6010 and the other end of which has an opening portion 6012.

One of the positive-electrode terminal portion 60 and the negative-electrode terminal portion 62 is exposed to the outside of the exterior case 61 from the opening portion 6012. In this embodiment, the positive-electrode terminal portion 60 is exposed to the outside of the exterior case 61 from the opening portion 6012.

The other one of the positive-electrode terminal portion 60 and the negative-electrode terminal portion 62 is formed integrally with the bottom portion 6010. In this embodiment, a negative-terminal plate serving as the negative-electrode terminal portion 62 is integrally formed with the bottom portion 6010.

For example, the exterior case 61 is formed by being subjected to a press processing such as deep drawing, thereby forming the other one of the positive-electrode terminal portion 60 and the negative-electrode terminal portion 62 integrally with the bottom portion 6010.

An insulating member 96 that covers at least a part excluding the positive-electrode terminal portion 60 and the negative-electrode terminal portion 62 in the area of the exterior case 61 which is exposed to the outside is provided.

The insulating member 96 may be overlapped with the positive-electrode terminal portion 60 and the negative-electrode terminal portion 62 as long as the positive-electrode terminal portion 60 and the negative-electrode terminal portion 62 function as the electrode terminals.

An annular insulating member 98 is provided between the positive-electrode terminal portion 60 and a part of the exterior case 61 that rims the opening portion 6012, and thus the positive-electrode terminal portion 60 and the exterior case 61 are prevented from being short-circuited.

As the insulating material that forms each of the insulating members 92, 94, and 96 described above, various insulating materials such as an insulating thermal resin (insulating coating resin), an insulating shrinking tube, and an insulating film which are publicly known can be used.

It should be noted that as a method of forming the exterior case, a method in which a deep drawing process and an ironing process are combined can be selected as appropriate. Any methods such as a DI process in which a drawing cap is formed and thereafter the ironing process is applied, a stretch drawing process in which a drawing cap is formed, thereafter stretch bending and unbending process is performed, and the ironing process is applied as necessary, and a multistage drawing process in which the drawing process in multiple stages is performed and thereafter the ironing process is performed may be used.

According to the third embodiment, the same effect as in the second embodiment can of course be obtained. Further, the exterior of the electric power generating apparatus 10 is formed of the exterior case 61, which is advantageous for improving durability and appearance of the electric power generating apparatus 10.

It should be noted that the number of coils 20 may be one or three or more, although the coil 20 is constituted of the first and second coils 20A and 20B in the first to third embodiments.

Further, the number of permanent magnets 18 may be one or three or more, although the permanent magnet 18 is constituted of the first and second permanent magnets 18A and 18B in the first to third embodiments.

Furthermore, in the first to third embodiments, the permanent magnet 18 is provided so that the permanent magnet 18 can be reciprocated with respect to the guide shaft 16.

It is only necessary that the permanent magnet 18 can be reciprocated. For example, the outer circumferential surface of the permanent magnet 18 may be reciprocated and guided by the inner circumferential surface of the casing 12.

As the structure that allows the permanent magnet 18 to be reciprocated, various structures publicly known can be employed.

In addition, in the above embodiments, the shield case 24 or 51 that covers the casing 12 is used, but whether the shield case is provided or not may be arbitrarily determined.

Fourth Embodiment

Next, a fourth embodiment will be described.

The fourth embodiment is different from the first to third embodiments in that electric power is generated by applying pressure to a piezoelectric element.

Figure 14:
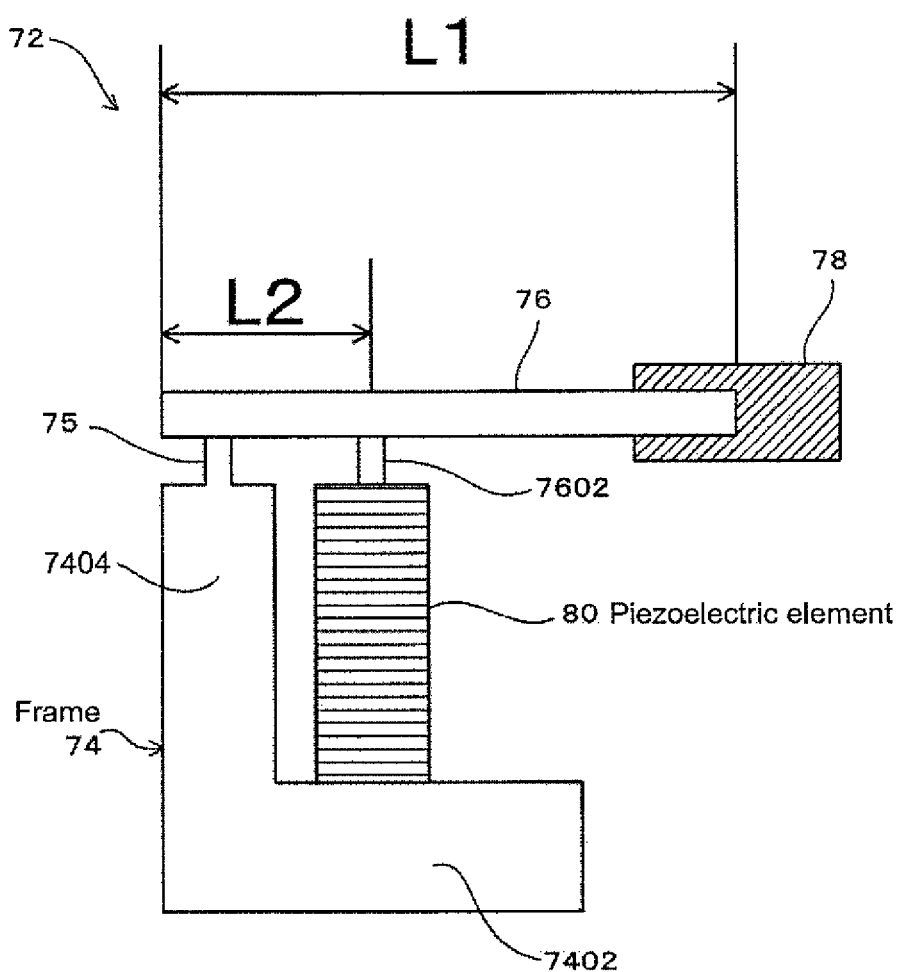
FIG. 14 is a structural diagram of an electric power generating unit of an electric power generating apparatus according to a fourth embodiment.
Figure 15:
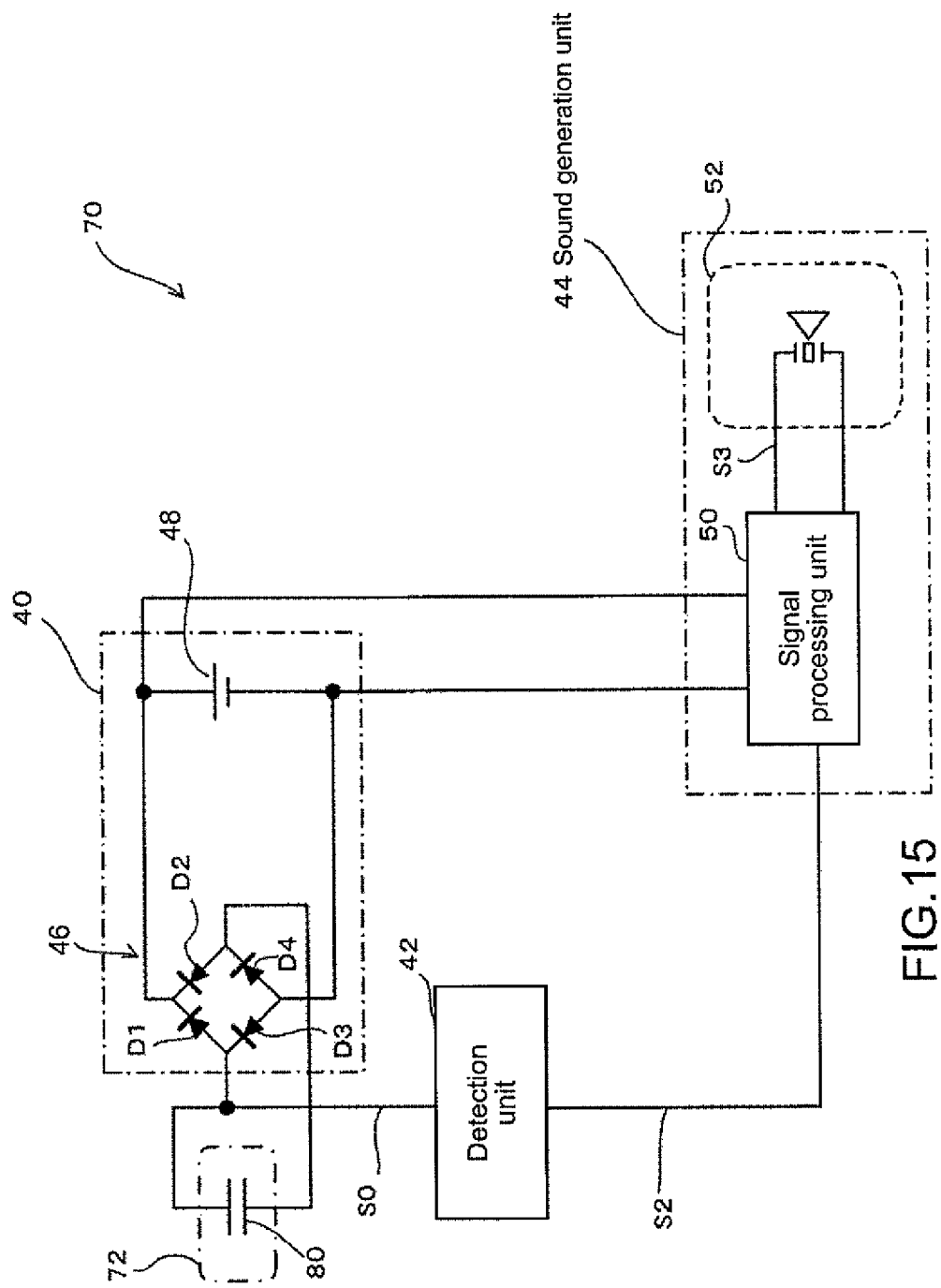
FIG. 15 is a block diagram showing a structure of the electric power generating apparatus according to the fourth embodiment.

FIG. 14 is a structural diagram of an electric power generating unit 72 of an electric power generating apparatus 70 according to the fourth embodiment, and FIG. 15 is a block diagram showing a structure of the electric power generating apparatus 70 according to the fourth embodiment.

As shown in FIG. 14, the electric power generating apparatus 70 includes the electric power generating unit 72, the electric circuit unit 40, the detection unit 42, and the sound generation unit 44.

As shown in FIG. 14, the electric power generating unit 72 includes a frame 74, a vibration lever 76, and a piezoelectric element 80.

In this embodiment, the frame 74, a support piece 75, and the vibration lever 76 are integrally formed with each other by processing a single metal material. As the metal material, various metal materials publicly known such as steel can be used.

The frame 74 has an L shape, and includes a base portion 7402 that is linearly extended and an upright portion 7404 that is uprisen from an end of the base portion 7402.

The frame 74 is attached to an appropriate position inside the electronic apparatus.

At the end of the upright portion 7404, the support piece 75 having a smaller cross-sectional area than the upright portion 7404 is upwardly protruded.

The vibration lever 76 has an elongated shape, and a base end thereof is integrally connected to the support piece 75. The vibration lever 76 is extended in the same direction as the base portion 7402 in parallel to the base portion 7402 and in a direction perpendicular to the upright portion 7404. That is, the vibration lever 76 can be vibrated with the support piece 75 being a support point.

Specifically, the tip end of the vibration lever 76 is a free end that functions as an anti-node of a free vibration and the base end of the vibration lever 76 is a support end that supports the free end and functions as a node of the free vibration.

Thus, according to this embodiment, the frame 74, the support piece 75, and the vibration lever 76 constitute a mechanical vibration means.

At a position closer to the support end on a lower surface of the vibration lever 76, a convex portion 7602 that protrudes toward the base portion 7402 (downwards) is formed.

The convex portion 7602 is provided at a point of application that is positioned between the free end and the support end of the vibration lever 76.

In this embodiment, the vibration lever 76 has a weight 78.

The weight 78 is connected to the free end of the vibration lever 76.

The piezoelectric element 80 generates a voltage due to a strain caused by applying a pressure.

The piezoelectric element 80 has a columnar shape that is extended in a vertical direction. A lower end surface of the piezoelectric element 80 is attached to the upper surface of the base portion 7402, and an upper end surface thereof is contacted with the convex portion 7602.

Thus, the piezoelectric element 80 constitutes a piezoelectric means that is provided at the point of application positioned between the free end and the support end of the mechanical vibration means and is pressurized by the vibration of the mechanical vibration means.

For the piezoelectric element 80, various piezoelectric elements publicly known such as a longitudinal-effect layered piezoelectric vibrator that is made of a PZT (piezoelectric zirconate titanate)-based material may be used.

The piezoelectric element 80 is provided with two electrodes for obtaining the voltage, and the two electrodes are connected to the rectifier circuit 46 shown in FIG. 15.

The electric power generating apparatus 70 including the electric power generating unit 72 described above is incorporated in the electronic apparatus.

Thus, when using the electronic apparatus, the user grabs the electronic apparatus and reciprocates the electronic apparatus with the user's arm in the direction in which the vibration lever 76 of the electric power generating apparatus 70 vibrates.

The reciprocation of the electronic apparatus causes the vibration lever 76 to repeatedly vibrate with the weight 78.

Along with the vibration, the acceleration and the force generated by the mass of the weight 78 and the vibration lever 76 are applied to the piezoelectric element 80 through the convex portion 7602.

It should be noted that the force applied to the piezoelectric element 80 at the time when the electronic apparatus is reciprocated is equal to a resultant obtained by multiplying the force applied to the vibration lever 76 and the weight 78 by a displacement magnification factor (according to the principle of leverage). Therefore, a relatively large force is applied to the piezoelectric element 80.

That is, the displacement magnification factor is expressed as L1/L2, in which L1 represents a distance from the support piece 75 (support point) to the free end of the vibration lever 76 and L2 represents a distance from the support piece 75 (support point) to the piezoelectric element 80 to which the force is applied.

Thus, obtained is the following expression:

$$P = P1 * L1/L2$$

where P represents the force applied to the piezoelectric element 80, and P1 represents the force applied to the vibration lever 76 and the weight 78.

The AC voltage S0 generated in the piezoelectric element 80 pressurized by the vibration of the vibration lever 76 is supplied to the electronic apparatus by the electric circuit unit 40 as the electric energy, thereby operating the electronic apparatus.

In addition, as in the first embodiment, the detection unit 42 generates the detection signal S2 by detecting the AC voltage S0, and the signal processing unit 50 supplies the sound signal S3 to the speaker 52 based on the detection signal S2.

As a result, the sound generation unit 44 generates the sound that is associated with at least one of the period and amplitude of the AC voltage S0 based on the detection result of the detection unit 42.

Thus, according to the fourth embodiment, the same effect as the first embodiment can be obtained.

Further, the modified examples of the first embodiment can of course be applied to the fourth embodiment.

The present application contains subject matter related to that disclosed in Japanese Priority Patent Application JP 2008-287576 filed in the Japan Patent Office on Nov. 10, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electric power generating apparatus comprising:
a casing including an interior space;
a permanent magnet that is provided in the interior space and capable of being reciprocated;
a coil provided on an outer periphery of the interior space;
an electric circuit unit to output a voltage, as electric energy, generated in the coil by reciprocating the permanent magnet;
a detection unit to detect a characteristic of the voltage;
a sound generation unit to generate sound that is associated with at least one of a period and amplitude of the voltage based on a result of detection by the detection unit;
wherein the electric power generating apparatus has an outline that is the same as that of one of a primary battery and a secondary battery that are commercially available and having a positive-electrode terminal portion and a negative-electrode terminal portion,
wherein the electric circuit unit outputs the electric energy through the positive-electrode terminal portion and the negative-electrode terminal portion; and
a shield case to cover an outer surface of the casing,
wherein the shield case forms an exterior of the electric power generating apparatus,
wherein the electric circuit unit, the detection unit, and the sound generation unit are stored in the shield case with the casing, and
wherein the positive-electrode terminal portion and the negative-electrode terminal portion are exposed to an outside of the shield case from an opening portion formed in the shield case.

2. The electric power generating apparatus according to claim 1, wherein the detection unit detects a period of the voltage as the characteristic of the voltage, and
wherein the sound generation unit generates the sound at least one of a frequency and a volume that are associated with a length of the period.

3. The electric power generating apparatus according to claim 1, wherein the detection unit detects an amplitude of the voltage as the characteristic of the voltage, and
wherein the sound generation unit generates the sound at least one of a frequency and a volume that are associated with a size of the amplitude.

4. The electric power generating apparatus according to claim 1, wherein the detection unit detects a period of the voltage as the characteristic of the voltage,
wherein the sound generation unit includes a speech synthesis unit for generating human voice by speech synthesis, and
wherein the sound generation unit generates the sound by generating a phrase associated with a length of the period by the speech synthesis unit.

5. The electric power generating apparatus according to claim 1, wherein the detection unit detects an amplitude of the voltage as the characteristic of the voltage,
wherein the sound generation unit includes a speech synthesis unit for generating human voice by speech synthesis, and wherein the sound generation unit generates the sound by generating a phrase associated with a size of the amplitude by the speech synthesis unit.

6. The electric power generating apparatus according to claim 1, wherein the electric power generating apparatus has the outline corresponding to an outline of a dry battery specified in one of JIS C8501 and JIS C8511.

7. The electric power generating apparatus according to claim 1, wherein the shield case is electrically insulated from at least one of the positive-electrode terminal portion and the negative-electrode terminal portion by an insulating member.

8. An electric power generating apparatus comprising:
a casing including an interior space;
a permanent magnet that is provided in the interior space and capable of being reciprocated;
a coil provided on an outer periphery of the interior space;
an electric circuit unit to output a voltage, as electric energy, generated in the coil by reciprocating the permanent magnet;
a detection unit to detect a characteristic of the voltage;
a sound generation unit to generate sound that is associated with at least one of a period and amplitude of the voltage based on a result of detection by the detection unit;
wherein the electric power generating apparatus has an outline that is the same as that of one of a primary battery and a secondary battery that are commercially available and having a positive-electrode terminal portion and a negative-electrode terminal portion,
wherein the electric circuit unit outputs the electric entry through the positive-electrode terminal portion and the negative-electrode terminal portion;
a shield case to cover an outer surface of the casing; and
an exterior case to form an exterior of the electric power generating apparatus,
wherein the shield case, the electric circuit unit, the detection unit, and the sound generation unit are stored in the exterior case, and
wherein the positive-electrode terminal portion and the negative-electrode terminal portion are exposed to an outside of the exterior case from an opening portion formed in the exterior case.

9. The electric power generating apparatus according to claim 8,
wherein the exterior case is electrically conductive, and
wherein the exterior case is electrically insulated from at least one of the positive-electrode terminal portion and the negative-electrode terminal portion by an insulating member.

10. The electric power generating apparatus according to claim 8,
wherein the exterior case is electrically conductive,
wherein the exterior case is electrically connected to one of the positive-electrode terminal portion and the negative-electrode terminal portion, and
wherein the exterior case has an area exposed to the outside and entirely covered with an insulating member.

11. The electric power generating apparatus according to claim 8,
wherein the exterior case is electrically conductive, and
wherein the exterior case has an area that faces an inside and is entirely covered with an insulating member to electrically insulate the exterior case from the positive-electrode terminal portion and the negative-electrode terminal portion.

12. The electric power generating apparatus according to claim 1, further comprising:
a shield case to cover an outer surface of the casing; and
an exterior case that forms an exterior of the electric power generating apparatus and has electrical conductivity,
wherein the shield case, the electric circuit unit, the detection unit, and the sound generation unit are stored in the exterior case,
wherein the exterior case has a bottomed tube shape, one end in an extended direction of which is blocked by a bottom portion and another end of which has an opening portion,
wherein one of the positive-electrode terminal portion and the negative-electrode terminal portion is exposed to an outside of the exterior case from the opening portion,
wherein another one of the positive-electrode terminal portion and the negative-electrode terminal portion is integrally formed with the bottom portion, and
wherein the exterior case has an area exposed to the outside and covered with an insulating member, the insulating member covering at least the area excluding the positive-electrode terminal portion and the negative-electrode terminal portion.

* * * * *